No. 890,075. PATENTED JUNE 9, 1908.
P. LIBAK & A. & P. WINDEN.
MILKING STOOL.
APPLICATION FILED APR. 10, 1908.
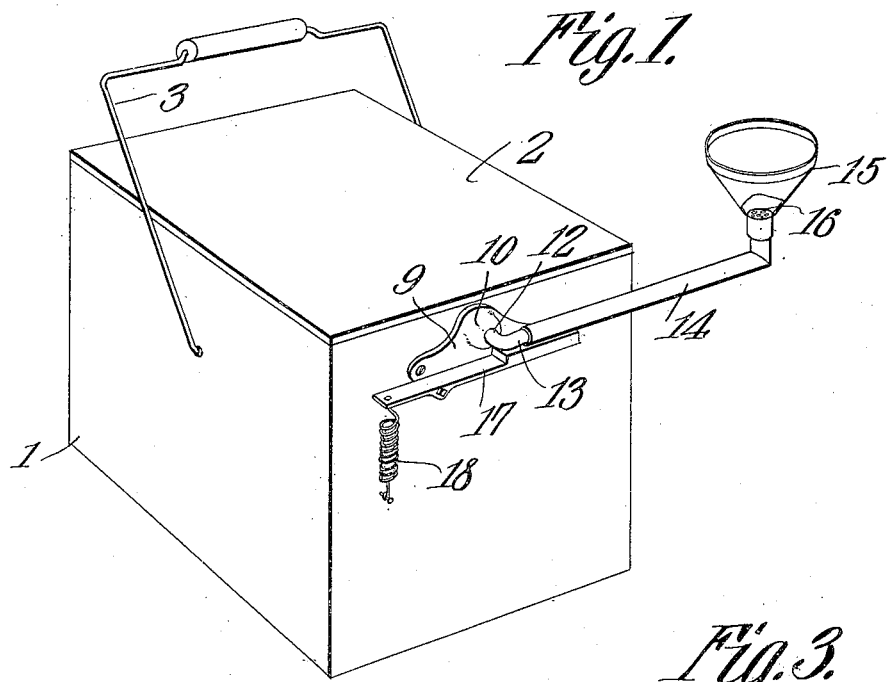
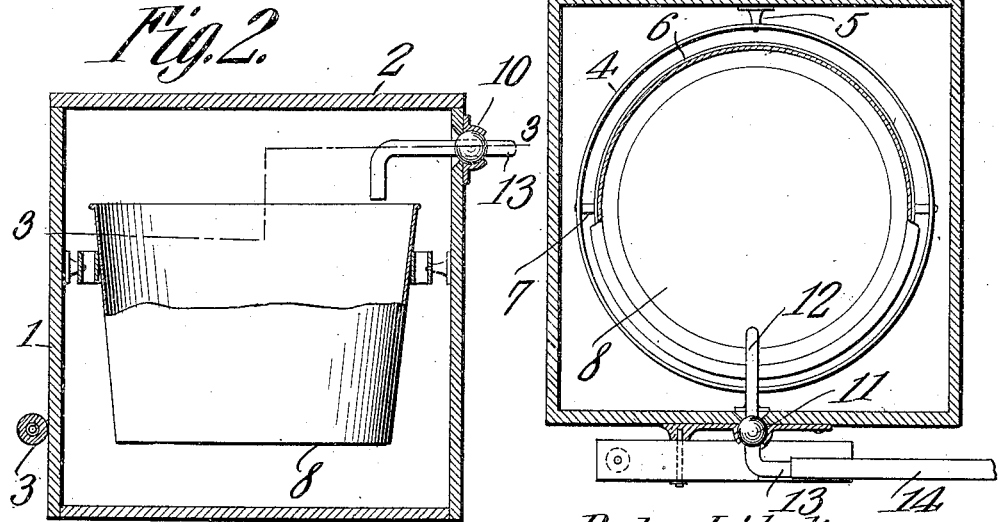

UNITED STATES PATENT OFFICE.

PEDER LIBAK, ANDREW WINDEN, AND PETTER WINDEN, OF MADELIA, MINNESOTA.

MILKING-STOOL.

No. 890,075.  Specification of Letters Patent.  Patented June 9, 1908.

Application filed April 10, 1908. Serial No. 426,365.

*To all whom it may concern:*

Be it known that we, PEDER LIBAK, a subject of the King of Norway, and ANDREW WINDEN and PETTER WINDEN, citizens of the United States, residing at Madelia, in the county of Watonwan, State of Minnesota, have invented a new and useful Milking-Stool, of which the following is a specification.

This invention relates to improvements in milking stools; and has for its object to provide a simple, cheap and strong structure for the purpose stated, constructed in the form of a closed box with hinged cover and adapted to contain a milk pail supported therein on gimbals by which means the milk pail will always remain in an upright position however irregular or inclined the ground may be on which the stool stands.

Another object of the invention pertains to means for delivering the milk to the pail which is accomplished by a pivoted or swinging pipe outside the stool having an enlarged mouth and through which pipe the milk passes into said stool and is discharged into the bucket.

With these and other objects in view the invention consists of the novel construction, combination and arrangement of parts hereinafter described and claimed, and illustrated in the accompanying drawing in which—

Figure 1 is a perspective view of the improved milking stool; Fig. 2 a vertical central sectional view of the same; and Fig. 3 a horizontal sectional view on the line 3—3 of Fig. 2.

Similar reference numerals are used for the same parts in all the figures.

The numeral 1 indicates the stool made preferably in the form of a cubical box closed on its sides and bottom and provided with a hinged cover 2 and carrying bail 3. Within the box is a ring 4 suspended on diametrically disposed horizontal pivots 5 fastened to opposite sides of the stool, and a second ring 6 within the ring 4 bearing on pivots 7, at opposite points of the second ring 6, projecting from the ring 4 midway between the pivots 5 which support the first named ring. These rings and their pivots form gimbals in which is suspended the milk pail 8. Supported in this manner it matters not how much the stool may be inclined or rocked, the milk pail will always remain in an upright or normal position.

A plate 9 is screwed or bolted on the outside of one side of the stool 1 near the top from which a hemispherical socket 10 projects outwardly. Within the socket is seated a spherical bearing 11 secured to a tube or pipe 12 which projects at one end through the wall of the stool and a short distance over the rim of the milk pail 8, and has its other or outer end 13 bent at a right angle and preferably threaded to enter the similarly internally threaded end of a tube 14 which extends beyond the stool sufficiently far to pass beneath the udder of a cow when a person is seated on the stool ready to milk the animal. The outer end of the tube 14 is turned upwardly and carries a funnel-shaped mouth 15 provided with a strainer 16 of perforated metal or wire. The tube 14 supported as it is by a ball and socket bearing, can be moved in any direction and is thus supported to prevent it being broken or bent should the cow kick or make any other unexpected move.

The pipe 14 is held in operative position by a lever arm 17 intermediately pivoted to the side of the stool 1, or to the plate 9, one end of said lever arm having a spring 18 attached thereto and its other arm, extending beneath the tube 14 forms a yielding support therefor. As previously stated, the tube 14 is screwed on the tube 12 so that it can be removed when not in use and also for the purpose of cleaning it and the tube 12.

The operation of the device is apparent and needs no further detailed description. After a pail has been filled, the cover, 2 is raised and the pail lifted from the ring 6, emptied and returned or another pail substituted.

From what has been said it will be clear that the invention affords a clean and sanitary utensil for the dairyman, the milk is kept in a closed receptacle away from foul odors, dirt and air laden with dangerous germs and gases whereby the danger of contamination through milk is lessened and the market value of dairy products increased.

Having described our invention, what we claim as new and desire to secure by Letters Patent is:

1. A milking stool comprising a closed case, a pail therein for holding milk, and a tube having a receiving mouth at one end and extending at its other end through said case and above said pail.

2. A milking stool comprising a closed case, means for flexibly supporting a pail therein, and a tube opening through one side of said stool into the same and having a mouth adapted to receive milk direct from a cow and discharge it into the pail within the stool.

3. A milking stool comprising a closed case provided with a tight closure, means for flexibly supporting a pail therein and a pipe movably mounted on one side of said stool, its inner end arranged to overlie a pail in the stool and its outer end provided with a receiving mouth for milk.

4. A milking stool comprising a closed case provided with a tightly fitting top, gimbals in said stool to carry a pail, a two part separable tube flexibly supported at one side of said stool one end of which extends within the same and above said gimbals and the other end projecting beyond the stool and fitted with a receiving mouth for milk.

5. A milking stool comprising a closed case, means therein for yieldingly supporting a pail, a tube provided with a spherical bearing projecting inwardly through one side of said stool, a plate provided with a seat for said spherical bearing, fastened to said stool, and a tube having a receiving mouth adapted to be removably attached to said first named pipe.

6. A milking stool comprising a closed case having a tightly fitting cover, gimbals therein for carrying a pail, a tube supported in a spherical bearing projecting at one end into said stool and provided with a receiving mouth on its external end, and a yielding support for said tube.

7. A milking stool comprising a closed case means therein for flexibly supporting a pail, a two part tube opening into said pail one part of which tube is provided with a spherical bearing and the other part adapted to be removably attached to the first part and having a receiving mouth thereon, and yieldable means for supporting said tube.

In testimony that we claim the foregoing as our own, we have hereto affixed our signatures in the presence of two witnesses.

PEDER LIBAK.
ANDREW WINDEN.
PETTER WINDEN.

Witnesses:
H. C. GUNDERSON,
M. S. DOSSETT.